United States Patent
Han et al.

(10) Patent No.: US 11,019,831 B2
(45) Date of Patent: Jun. 1, 2021

(54) LOW CALORIE COFFEE BEVERAGE COMPOSITION

(71) Applicant: SAMYANG CORPORATION, Seoul (KR)

(72) Inventors: Tae-Chul Han, Yongin-si (KR); Bong Chan Kim, Seoul (KR); Yong-In Kim, Yongin-si (KR); Il Seo, Gwangju-si (KR); Seung Mi Lee, Hwaseong-si (KR); Hye Jin Lim, Seongnam-si (KR)

(73) Assignee: SAMYANG CORPORATION, Seoul (KR)

( * ) Notice: Subject to any disclaimer, the term of this patent is extended or adjusted under 35 U.S.C. 154(b) by 0 days.

(21) Appl. No.: 16/342,581

(22) PCT Filed: Oct. 31, 2017

(86) PCT No.: PCT/KR2017/012171
§ 371 (c)(1),
(2) Date: Apr. 17, 2019

(87) PCT Pub. No.: WO2018/084537
PCT Pub. Date: May 11, 2018

(65) Prior Publication Data
US 2020/0054039 A1    Feb. 20, 2020

(30) Foreign Application Priority Data

Nov. 1, 2016  (KR) .................. 10-2016-0144718

(51) Int. Cl.
*A23L 2/60* (2006.01)
*A23F 5/40* (2006.01)
*A23F 5/24* (2006.01)

(52) U.S. Cl.
CPC ................ *A23F 5/40* (2013.01); *A23F 5/243* (2013.01)

(58) Field of Classification Search
CPC .......... A23V 2200/16; A23V 2200/132; A23V 2250/60; A23V 2250/24; A23V 2200/00; A23V 2250/28; A23V 2200/3322; A23V 2250/2108; A23V 2250/284; A23L 2/60; A23L 27/30; A23L 27/34; A23L 29/30; A23L 33/125; A23L 33/105; A23F 5/40; A23F 5/243
See application file for complete search history.

(56) References Cited

U.S. PATENT DOCUMENTS

| | | | |
|---|---|---|---|
| 2009/0304891 | A1* | 12/2009 | Fujihara .................. A23C 9/13 426/548 |
| 2014/0271996 | A1 | 9/2014 | Prakash et al. |
| 2016/0302463 | A1 | 10/2016 | Woodyer et al. |

FOREIGN PATENT DOCUMENTS

| | | |
|---|---|---|
| EP | 2756763 | 7/2014 |
| JP | H06-28542 | 4/1994 |
| JP | H11-103778 | 4/1999 |
| JP | 2014-036645 | 2/2014 |
| JP | 2014-113059 | 6/2014 |
| JP | 2014-124157 | 7/2014 |
| JP | 2014-529994 | 11/2014 |
| JP | 2015-144573 | 8/2015 |
| KR | 10-1318422 | 10/2013 |
| KR | 10-2014-0089137 | 7/2014 |
| KR | 10-2015-0015030 | 2/2015 |
| KR | 10-1617379 | 5/2016 |
| KR | 10-2016-0089551 | 7/2016 |
| KR | 10-1656063 | 9/2016 |
| KR | 10-2018-0046783 | 5/2018 |
| WO | 2008-059623 | 5/2008 |
| WO | 2008-142860 | 11/2008 |
| WO | 2015-075473 | 5/2015 |

OTHER PUBLICATIONS

Web site(shopping mall): Shizenkan, "Bione Rare Sugar Oligo", Oct. 10, 2016 <http://www.shizenkan.net/store/vi0129>.
KIPO, International Search Report & Written Opinion of PCT/KR2017/012171 dated Feb. 5, 2018.
Database GNPD [Online] MINTEL; Jul. 18, 2014 (Jul. 18, 2014), anonymous: "Healthy Cafe Coffee Granules", XP055697382, retrieved from www.gnpd.com; Database accession No. 2541071.
Database GNPD [Online] MINTEL; Nov. 3, 2015 (Nov. 3, 2015), anonymous: "Healthy Cafe Au Lait", XP055697381, retrieved from www.gnpd.com; Database accession No. 3571591.
Anonymous, "Release of rare sugar & oligosaccharide-containing syrup", SAKU Publishing, [online] (2014.5.7.) https://www.newmagazine.ne.jp/b-k-news-topics201408.html.
Teruo Nakakuki, Journal of the Textile Society, vol. 52, No. 2, 1996, pp. 57-62 (1996) https://doi.org/10.2115/fiber.52.P57.
EPO, Supplementary European Search Report of EP 17867571.6 dated Jun. 3, 2020.

* cited by examiner

*Primary Examiner* — Hong T Yoo
(74) *Attorney, Agent, or Firm* — Lex IP Meister, PLLC

(57) ABSTRACT

The present invention relates to a coffee drink composition comprising allulose, oligosaccharide and coffee extract, and a method of preparation thereof, and it provides a coffee drink composition having a high sugar content and a low calorie and can give more excellent sensory properties to coffee drinks such as Americano.

12 Claims, No Drawings

LOW CALORIE COFFEE BEVERAGE COMPOSITION

TECHNICAL FIELD

The present invention is a coffee drink composition comprising allulose and oligosaccharide and method of preparation thereof, and can provide a low calorie drink by using allulose, and in particular, it is prepared with high preparation stability, so it can be used in drinks.

BACKGROUND ART

In recent years, as the national diet has been westernized, the consumption of favorite food and food and beverage has been significantly increased, and in particular, since the frequency of drinking of coffee or coffee milk has increased than the past, the coffee beverage market offers coffee in a variety of containers such as bottles, cups, packs, etc. in addition to the conventional canned coffee, and the coffee market has dramatically increased in the form of high-grade espresso.

However, the beverage on the market contains a large amount of sugar, and therefore there is a problem of causing adult diseases such as dental caries, obesity and diabetes, etc. For the health of the people, the government also encourages the implementation of "sugar reduction" of food and beverage compositions by policy. 'Saccharide' according to the instrumental analysis method of Food Sanitation Law means the total of monosaccharides and disaccharides present in food, and there are fructose and glucose as monosaccharides and there are sucrose, maltose and lactose as disaccharides. To achieve the above sugar reduction in food and beverage, particularly sugar substitution is inevitable.

Sugar is mainly composed of sucrose and it is one of representative sweeteners that add sweetness. Sugar has excellent sweetness, and therefore it has been considered as the most preferable sweetener which is added to various foods and processed foods, etc. from the past and enhances the taste of food and increase the appetite. However, recently, as the harmfulness of sugar continues to be revealed, problems have been raised. Specifically, excessive intake of sugar is pointed out as a major cause of various lifestyle diseases such as obesity and diabetes, etc. in addition to cavities, and thus the necessity of developing sweeteners which can replace it has emerged all over the world. In recent years, a variety of sweetener materials have been developed, but considering the degree of sweetness and quality of sweetness, sugar and these sweetener materials and various functional materials such as dietary fiber, etc. are mixed and commercialized.

Allulose used as a sweetener which replaces the sugar is an epimer of carbon number 3 of fructose, and it has the sweetness equivalent to 70% of fructose, and is a functional sugar of controlling sugar blood, preventing cavities and inhibiting fat synthesis in liver. Sugar alcohols which are widely used as a sugar-replacing sweetener have side effects of causing diarrhea when ingested over a certain amount, but allulose has no known side effects. Thus, the interest of allulose as a sweetener is increasing.

DISCLOSURE

Technical Problem

An object of the present invention is to provide a coffee drink composition comprising allulose, oligosaccharide and coffee extract.

In addition, another object of the present invention is to provide a method of preparation of drink composition comprising a step of adding allulose, oligosaccharide and coffee extract to water and mixing.

Technical Solution

The present invention relates to a coffee drink composition comprising allulose and oligosaccharide and a method of preparation thereof, and particularly, it is to provide a composition which can improve physical properties or texture of food and enhance the preparation stability according to the use of allulose, oligosaccharide and coffee (or coffee extract) in combination.

Hereinafter, the present invention will be described in more detail.

One example of the present invention provides a coffee drink composition comprising allulose, oligosaccharide and coffee extract.

In particular, the allulose used in the present invention has an advantage of reducing excessive intake of sucrose and having a good effect on prevention of adult diseases such as diabetes, obesity, etc., and also having a high degree of sweetness in a level similar to sucrose. Particularly, the allulose exhibits cleanliness or metallic taste in addition to sweet taste different from sucrose, and therefore it is difficult to consider it as a sweetener which can completely replace sucrose, but the drink composition of the present invention applies allulose to coffee drink, thereby having an effect of masking the metallic taste, etc. of allulose by bitter taste and sour taste of coffee drink and also alleviating the bitter taste of coffee, and it can give cleanliness particularly to coffee drink requiring a clean sense as Americano.

As the allulose is comprised in the coffee drink composition of the present invention in the above range, Maillard reaction of allulose is accompanied and therefore browning occurs more than the case of containing only sucrose, and thus there is an excellent coloring effect particularly in the coffee drink composition.

The allulose can be prepared by performing chemical synthesis, or a biological method using allulose epimerase, preferably, by a biological method, for example, by a microorganism or enzyme reaction. For example, the allulose is mixed saccharide or obtained therefrom, and the mixed saccharide may be mixed saccharide prepared by reacting a composition for producing allulose comprising one or more kinds selected from the group consisting of allulose epimerase, a microbial cell of a strain producing the epimerase, a culture of the strain, a lysate of the strain, and an extract of the lysate or culture with a fructose-containing raw material, or obtained therefrom.

The allulose used in the coffee drink composition of the present invention may be in a form of syrup or powder. The allulose syrup may be a solution prepared using allulose at a variety of concentrations, and the solid allulose in the allulose syrup may be comprised as 10 to 100% by weight based on 100% by weight of the allulose syrup, and preferably, it may be prepared by mixing 70 to 99% by weight. When using the allulose powder, the allulose powder solid may use the total composition powder, for example, allulose having a purity of 90% or more as the powder.

The allulose syrup may be obtained through separation, purification and concentration processes from the allulose only or mixed saccharide. In one example of the present invention, the allulose syrup undergone the separation and purification processes may be allulose syrup which has an electrical conductivity of 1 to 50 µS/cm, and contains 10% by weight or more of allulose in the form of a colorless or light-yellow liquid having sweetness.

As one example for preparation of allulose of the present invention, an expression system which can produce allulose epimerase with high expression rate and stability, a GRAS (Generally recognized as safe) microorganism using the same, and a method of producing allulose containing a microorganism and enzyme using the expression system, etc. are described in detail in Korean Patents No. 10-1318422 and No. 10-1656063, etc.

When the allulose syrup is added to the coffee drink composition of the present invention, it may be prepared by mixing the allulose syrup containing 95% by weight of the solid allulose in 100% by weight of the allulose syrup of 0.1 to 20% by weight, preferably, 0.5 to 10% by weight, based on 100% by weight of the total coffee drink composition.

The oligosaccharide used in the coffee drink composition of the present invention is a generic term of saccharides having low viscosity in which monosaccharides such as glucose, fructose or galactose, etc. are hydrated and condensed by glycoside bonding, and about 2 to 5 monosaccharides are combined. The oligosaccharide is obtained by processing a saccharide solution obtained from a saccharide raw material, and there are fructo-oligosaccharide, isomalto-oligosaccharide, galacto-oligosaccharide, malto-oligosaccharide, xylo-oligosaccharide, gentio-oligosaccharide, etc., and as the oligosaccharide, depending on the kinds of raw materials (substrates), malto-oligosaccharide or isomalto-oligosaccharide using starch, galacto-oligosaccharide using lactose, and fructo-oligosaccharide using sucrose may be used.

The oligosaccharide may be a mixed saccharide form in a form of syrup or powder having 10% by weight or more of oligosaccharide among the total saccharide solid, and may be a mixed saccharide form containing some of monosaccharides such as glucose and fructose or disaccharides such as maltose, etc. Preferably, in the present invention, it may be prepared by mixing isomalto-oligosaccharide additionally, and it can give body taste by using isomalto-oligosaccharide, thereby giving required physical properties when provided as a coffee drink product. The oligosaccharide may be comprised as 0.1 to 40% by weight, preferably 0.1 to 40% by weight, based on 100% by weight of the total composition, and for example, when isomalto-oligosaccharide is added, it may be prepared by mixing the isomalto-oligosaccharide of 0.1 to 20% by weight, preferably 0.1 to 5% by weight, more preferably 0.1 to 1% by weight, based on 100% by weight of the total composition.

Therefore, the coffee drink composition of the present invention has a sugar content (Brix) of 0.5 to 20, preferably 3 to 10.

In addition, the allulose may be alone or a mixed saccharide containing additional other saccharides, and the example of the mixed saccharide may contain 1 to 99.9% by weight of allulose based on 100% by weight of the solid content of the total mixed saccharide, and may further comprise one or more kinds selected from the group consisting of fructose and glucose.

The additional other saccharides may comprise 1 to 90% by weight of fructose and/or 1 to 50% by weight of glucose.

The coffee drink composition may be prepared by additionally mixing one or more kinds of saccharides selected from the group consisting of sucrose, fructose, starch syrup, rare sugar and high-intensity sweetener, maltitol, D-sorbitol, polyglycitol syrup, indigestible maltodextrin and polydextrose. It may be prepared by mixing the one or more kinds of saccharides mixed additionally of 0.1 to 20% by weight, preferably 0.1 to 10% by weight, based on 100% by weight of the total coffee drink composition, and when the coffee drink composition is prepared as containing one or more kinds of additional saccharides, it may be prepared by mixing in a form of syrup comprising the one or more kinds of saccharides and allulose.

Otherwise, the coffee drink composition of the present invention may be characterized by not containing sucrose. The allulose-containing coffee drink composition of the present invention can not only give a similar level of sugar content to sucrose even in the case of preparing liquid coffee which does not comprise sucrose, namely, is free of sugar, but also give unique cleanliness or bitter taste of allulose, and therefore it is excellent for improving coffee drink preference.

The rare sugar may comprise various rare sugars such as allose, tagarose, altrose, etc., and the high-intensity sweetener may be one or more kinds selected from the group consisting of aspartame, acesulfame K, sodium cyclamate, sodium saccharin, sucralose, stevia sweetener (steviol glucosides, enzymatically modified stevia), dulcin, thaumatin, tomatine, neotame, rebaudioside A and monellin.

The coffee extract comprised in the coffee drink composition of the present invention may be used as obtained by adding ground coffee beans to an extractor for extracting coffee and adding hot water of 95° C. or higher to the extractor for extracting coffee and extracting to obtain coffee extract, and then filtering with a filter 1~2 times The solid coffee in the coffee extract of the present invention may be comprised in a range of 0.1 to 70% by weight, preferably 0.1 to 65% by weight or 1 to 50% by weight, based on 100% by weight of the coffee extract.

As the coffee beans used for the coffee extract, Brazil Santos, Brazil Cerrado, Brazil Santa Lucia, Brazil Yellow Bourbon, Ethiopia Yirgacheffe, Ethiopia Sidamo, Colombia Supremo, KenyaAA, Tanzania Kilimangaro, Costa Rica Tarrazu, Guatemala Antigua, Guatemala Rainforest Coban, Guatemala Highland Huehue, Hawaiian Kona, Jamaica Blue Mountain, Yemen Mocha and Indonesia Gayo Mountain may be used, but not limited thereto.

The coffee drink composition of the present invention may further comprise vitamin C, and by vitamin C, it can give coffee drink sour taste or nutrients and play a role as an antioxidant, and also prevent allulose or added saccharides from being degraded by physical shock such as heat. For example, when prepared by mixing the vitamin C additionally, it may be prepared by mixing the vitamin C of 0.001 to 0.5% by weight, preferably 0.01 to 0.05% by weight, based on 100% by weight of the total composition. For example, when vitamin C is comprised in the coffee drink composition of the present invention, allulose and vitamin C may be prepared in a weight ratio of 90:10 to 99:1.

The drink composition of the present invention may further comprise a liquid medium according to the kinds of drink, and for example, it may comprise one or more kinds selected from the group consisting of water, milk and soybean milk, but not limited thereto. The milk may be added as crude milk or processed crude milk. A case where the coffee drink composition of the present invention comprises only water as the liquid medium is referred to as an Americano coffee drink.

The liquid medium may comprise 1 to 99% by weight, 10 to 70% by weight, 50 to 99% by weight, or 60 to 95% by weight, based on 100% by weight of the total drink composition.

The drink composition of the present invention optionally may further comprise one or more selected from the group consisting of stabilizer, emulsifier, sweetener, pH controlling agent and coloring agent.

As a stabilizer which can be used in the present invention, one or more kinds selected from the group consisting of gums such as gellan gum, xanthan gum, carrageenan, guar gum, Arabic gum, locust bean gum, celluloses such as CMC (carboxymethyl cellulose), etc., pectin or gelatin may be used, but not limited thereto.

As an emulsifier which can be used in the composition, any emulsifier which can be used in food may be used without particular limitation, and for example, non-ionic emulsifier, cationic emulsifier, amphoteric emulsifier, etc. may be used, and it may comprise specifically fatty acid ester, preferably one or more kinds selected from the group consisting of lecithin, monoglycerin fatty acid ester, polyglycerin condensed fatty acid ester and polysorbate emulsifier, and preferably, sucrose fatty acid ester (S-1670 and/or S570) may be used.

The emulsifier may be comprised as 0.0001 to 0.5% by weight, preferably 0.001 to 0.01% by weight, based on 100% by weight of the total composition.

As a pH controlling agent which can be used in the present invention, one or more kinds selected from the group consisting of sodium bicarbonate, potassium carbonate, sodium citrate and sodium ascorbate may be used. The pH controlling agent may be further comprised or not be comprised, so that the pH of the drink composition of the present invention is 5.5 to 7.0, preferably pH 5.2 to 6.5.

The coffee drink composition may be characterized by containing monosaccharides and/or disaccharides, for example, saccharides containing fructose and glucose as monosaccharides and sucrose, maltose and lactose as disaccharides as 0.1 to 7 g/240 mL, preferably 1 to 7 g/240 mL. This is 10 to 90% reduction in saccharides compared to coffee drink prepared by containing only sucrose giving the same level of sweetness.

Accordingly, the calorie of the coffee drink composition may be 0.1 to 30 kcal/240 ml, preferably 10 to 25kcal/240 ml, more preferably 10 to 15 kcal/240 ml.

Another example of the present invention provides an Americano coffee drink composition comprising allulose, oligosaccharide, coffee extract and water.

The matters related to the coffee drink composition may be equally applied to the Americano coffee drink composition.

Other one example of the present invention provides a method for preparing a coffee drink composition, which is a method of preparation of a coffee drink composition comprising a step of adding allulose, oligosaccharide and coffee extract and mixing.

The matters related to the coffee drink composition may be equally applied to the method of preparation of the drink composition.

The allulose to be added and mixed in the method of preparation of a coffee drink composition of the present invention may be in a form of syrup or powder. The allulose syrup may be a solution prepared using allulose at a variety of concentrations, and the solid allulose in the allulose syrup may be comprised as 10 to 75% by weight, based on 100% by weight of the allulose syrup. When the allulose powder is used, the allulose powder solid may be used as the total composition powder, for example, powder of allulose having a purity of 90% or more.

The oligosaccharide used in the method of preparation of a coffee drink composition of the present invention is a generic term of saccharides having low viscosity in which monosaccharides such as glucose, fructose or galactose, etc. are hydrated and condensed by glycoside bonding, and about 2 to 5 monosaccharides are combined. The oligosaccharide is obtained by processing a saccharide solution obtained from a saccharide raw material, and there are fructo-oligosaccharide, isomalto-oligosaccharide, galacto-oligosaccharide, malto-oligosaccharide, xylo-oligosaccharide, gentio-oligosaccharide, etc., and as the oligosaccharide, depending on the kinds of raw materials (substrates), malto-oligosaccharide or isomalto-oligosaccharide using starch, galacto-oligosaccharide using lactose, and fructo-oligosaccharide using sucrose may be used.

The oligosaccharide may be a mixed saccharide form in a form of syrup or powder having 10% by weight or more of oligosaccharide among the total saccharide solid, and may be a mixed saccharide form containing some of monosaccharides such as glucose and fructose or disaccharides such as maltose, etc. Preferably, in the present invention, it may be prepared by mixing isomalto-oligosaccharide additionally, and it can give body taste by using isomalto-oligosaccharide, thereby giving required physical properties when provided as a coffee drink product. The oligosaccharide may be comprised as 0.1 to 40% by weight, preferably 0.1 to 40% by weight, based on 100% by weight of the total composition, and for example, when isomalto-oligosaccharide is added, it may be prepared by mixing the isomalto-oligosaccharide of 0.1 to 20% by weight, preferably 0.1 to 5% by weight, based on 100% by weight of the total composition.

The coffee extract to be added and mixed in the method of preparation of the present invention may comprise solid coffee in the coffee extract of the present invention in a range of 0.1 to 70% by weight, preferably 0.1 to 65% by weight, or 1 to 50% by weight, based on 100% by weight of the coffee extract.

The method of preparation of the present invention may further comprise a method for adding ground coffee beans to an extractor for extracting coffee and adding hot water of 95° C. or higher to the extractor for extracting coffee and extracting to obtain coffee extract, and then filtering with a filter 1~2 times The method of preparation of the present invention may comprise a step of mixing one or more kinds of saccharides selected from the group consisting of sucrose, fructose, starch syrup, glucose, rare sugar and high-intensity sweetener additionally. It is prepared by mixing one or more kinds of saccharides mixed additionally of 0.1 to 20% by weight, preferably 1 to 10% by weight, based on 100% by weight of the total coffee drink composition, and when the coffee drink composition is prepared as containing one or more of additional saccharides, it may be mixed and prepared in a syrup form containing the one or more of saccharides and allulose and oligosaccharide.

In addition, the method of preparation may comprise a step of mixing vitamin C additionally, and it may be prepared by mixing the vitamin C as 0.001 to 0.5% by weight, preferably 0.01 to 0.05% by weight, based on 100% by weight of the total composition.

In addition, the method of preparation of a coffee drink composition of the present invention may further comprise one or more selected from the group consisting of a sterilizing step, a cooling step, a homogenizing step and a filling step.

As the sterilizing step, sterilizing methods which can be used in food such as low temperature long time method (LTLT), high temperature short time method (HTST) and ultra high temperature heating method (UHT), etc. may be used non-restrictively.

In addition, the cooling step may cool sterilized or non-sterilized treatments at a temperature of 5 to 15° C.

ADVANTAGEOUS EFFECTS

The present invention is a coffee drink composition containing allulose and a method of preparation thereof, and it applies allulose and oligosaccharide to coffee, thereby being a low-calorie coffee drink and masking the unique bitter taste or metallic taste of allulose, while giving refreshment and viscosity to coffee drink, and therefore it is expected to be usefully used in the coffee drink industry.

MODE FOR INVENTION

The present invention will be described in more detail by the following illustrative examples, but the scope of the present invention is not intended to be limited by the following examples.

Preparative Example 1. Allulose Syrup Preparation

As allulose, allulose syrup was prepared from fructose substrates by the substantially same biological method as the preparation method disclosed in Korean Patent No. 10-16173797.

Specifically, a gene (DPE gene; Gene bank: EDS06411.1) encoding allulose epimerase derived from *Clostridium scindens* (*Clostridium scindens* ATCC 35704) was introduced to a recombinant vector (pCES_sodCDPE), and with the prepared recombinant vector (pCES_sodCDPE) was transformed into *Corynebacterium glutamicum* by electroporation. The beads containing the transformed *Corynebacterium glutamicum* cells were prepared and filled in an immobilization reaction column, and the 24~26 (w/w) % allulose syrup having a composition of glucose:fructose:allulose:oligosaccharide=6:67:25:2 was obtained from 95 wt % of fructose at 40 Brix.

To remove impurities such as colored and ion components, etc., the obtained allulose syrup was treated by flowing through a column at a room temperature in which cation exchange resin, anion exchange resin and mixed resins of cation and anion exchange resins at a hourly rate of two times of the volume as that of ion exchange resin. Then, using a chromatography filled with a calcium ($Ca^{2+}$) type of ion exchange resin, allulose fraction with a high purity was obtained. The allulose fraction was ion-purified and concentrated, to prepare the allulose syrup containing allulose 95 wt % and fructose 5 w t% , based on 100 wt % of the solid content of saccharide syrup composition.

The pH, color value and electrical conductivity of the allulose syrup having 95wt % of the allulose content were measured and shown in the following Table 1.

TABLE 1

| Classification | Allulose syrup having 95 wt % of allulose |
| --- | --- |
| pH | 4.41 |
| Color value (absorbance, 420 nm) | 0.039 |
| Electrical conductivity (ms/cm) | 15.13 |

Preparative Example 2. Preparation of Coffee Drink Composition

An acidity regulator in hot water having a temperature of over 85° C., coffee extract was added and then was added with coffee extract. The coffee extract was coffee extract at 4.9 bx, which was prepared from coffee bean by hot water extraction. After vitamin C is additionally input to the mixture, it was heat-treated for 1-5 seconds in the temperature range of 132~135° C. with the addition of water. Then, the product was cooled, matured and stored. The coffee drink composition of Examples 1 and 2 were prepared according to the composition of the following Table 2.

As comparative examples, coffee drink compositions were prepared according to the same method as Examples 1 and 2 by using only sucrose as saccharide (Comparative example 1), by including only sucrose and allulose syrup (Comparative example 2).

TABLE 2

| Raw material name | Comparative example 1 | Comparative example 2 | Example 1 | Example 2 |
| --- | --- | --- | --- | --- |
| Coffee extract (Solid content of 4.1%) | 22.80 | 22.80 | 22.80 | 22.80 |
| White sucrose | 2.800 | 1.4 | — | — |
| Allulose syrup | — | 2.86 | 5.720 | 5.720 |
| Isomalto-oligosaccharide (Samyang Corporation) | — | — | 0.35 | 2.000 |
| Sodium bicarbonate | 0.080 | 0.080 | 0.080 | 0.080 |
| Vitamin C | 0.020 | 0.02 | 0.020 | 0.020 |
| Purified water | Residual quantity | Residual quantity | Residual quantity | Residual quantity |
| Total | 100.000 | 100.000 | 100.000 | 100.000 |

Test Example 1. Physical Property Evaluation 1.1 pH Measurement The pH of the coffee drink compositions of Preparative example 2 was measured using a pH meter and shown in the following Table 3.

1.2 Sugar Content Measurement

The sugar content of the coffee drink compositions of Preparative example 2 was measured using Digital Refractometer (ATAGO Digital Refractometer RX-5000) and shown in the following Table 3.

TABLE 3

| Item | Comparative example 1 | Comparative example 2 | Example 1 | Example 2 |
| --- | --- | --- | --- | --- |
| pH | 6.25 | 6.196 | 6.187 | 6.192 |
| Brix | 4.02 | 4.63 | 5.57 | 6.71 |

As can be seen in Table 3, it was confirmed that the coffee drink composition of examples of the present invention had a pH similar to the Comparative example prepared using only sugar, and in particular, it could exhibit a higher level of sugar content than Comparative examples.

Test Example 2. Saccharide Content and Calorie Comparison

The saccharides in 240 mL of the coffee drink composition prepared in Preparative example 2 were measured by calculating the total content of monosaccharides and disaccharides according to the instrumental analysis method. The calorie was measured by the theoretical value calculation method using nutritional components and compared with the Comparative example compositions. The result was shown in the following Table 4.

TABLE 4

| Item | Comparative example 1 | Comparative example 2 | Example 1 | Example 2 |
|---|---|---|---|---|
| Saccharide (g/240 mL) | 7.5 | 4.5 | 0.6 | 1.0 |
| Calorie (Kcal/240 mL) | 30 | 19 | 11 | 23 |

As can be seen in Table 4, it could be confirmed that the coffee drinks of Examples 1 to 3 had significantly low saccharide content and also an excellent calorie reduction effect, compared to the Comparative examples.

Test Example 3. Sensory Evaluation

In the coffee drinks prepared with the composition of Preparative example 2, the five evaluation items of sweet taste, bitter taste, cleanliness of residual taste, body taste, degree of richness and degree of sweetness were evaluated according to the following evaluation criteria, and the evaluation result was shown in Table 5. Sensory evaluation was performed on 80 adult male and female panelists in 20-50 s using a 5-point scaling method.

[Evaluation Criteria]

Sweet taste: no sweet taste at all (0 point)—very strong sweet taste (5 points)

Sweet taste (sucrose basis): degree of sweet taste based on sucrose 1

Bitter taste: no bitter taste at all (0 point)—very strong bitter taste (5 points)

Cleanliness of residual taste: not clean residual taste at all (0 point)-very clean residual taste (5 points)

Body taste: no body taste at all (0 point)—very high body taste (5 points)

Degree of richness: very light feeling in mouth (0 point)—very heavy feeling in mouth (5 points)

Overall satisfaction: very unsatisfactory (0 point)—very satisfactory (5 points)

TABLE 5

| Evaluation items | Comparative example 1 | Comparative example 2 | Example 1 | Example 2 |
|---|---|---|---|---|
| Sweet taste | 2.1 | 2.0 | 2.2 | 2.4 |
| Sweet taste (sucrose basis) | 1.00 | 0.98 | 1.0 | 1.1 |
| Bitter taste | 3.6 | 3.5 | 3.2 | 3.2 |
| Cleanliness of residual taste | 2.3 | 3.0 | 2.7 | 2.5 |
| Body taste | 2.1 | 1.9 | 2.1 | 2.8 |
| Degree of richness | 2.1 | 1.8 | 2.1 | 3.2 |
| Overall satisfaction | 3.4 | 3.4 | 3.8 | 3.2 |

As can be seen in Table 5, the coffee drink compositions of Examples 1 and 2 can exhibit a similar level of sweet taste, and also can alleviate bitter taste of coffee due to the addition of allulose, compared to the coffee drink composition of Comparative example 1 containing only sucrose. In addition, the composition of Comparative example 2 containing only allulose had a low sugar content and the refreshment of residual taste due to allulose addition, and therefore the degree of richness taste of drink was low. However, the compositions of Examples 1 and 2 further containing isomalto-oligosaccharide exhibited the excellent body taste and high richness taste in mouth, despite of low sugar content. However, it was confirmed that the composition of Example 2 exhibited excessively high richness taste due to high content of the isomalto-oligosaccharide. Therefore the overall savory satisfaction of the coffee drink composition of Example 1 was the most excellent.

The invention claimed is:

1. A coffee drink composition comprising allulose, isomalto-oligosaccharide, and coffee extract,
    wherein the allulose is in an allulose syrup containing allulose at a solid content of 70 to 99% by weight based on 100% by weight of the allulose syrup, wherein the composition comprises 0.1 to 20% by weight of the allulose syrup, and 0.1 to 20% by weight of the isomalto-oligosaccharide based on 100% by weight of the coffee drink composition, and
    wherein the coffee drink composition has a calorie of 10 to 25 kcal/240 mL,
    wherein the coffee extract is prepared by mixing a solid coffee of 0.1 to 65% by weight based on 100% by weight of the coffee extract,
    wherein the coffee drink composition further comprises vitamin C, and
    wherein the isomalto-oligosaccharide comprises about 2 to 5 monosaccharides linked via glycoside bonds.

2. The coffee drink composition according to claim 1, wherein the coffee drink composition is characterized by not comprising sucrose.

3. A method for preparing a coffee drink composition according to claim 2 comprising a step of adding allulose, isomalto-oligosaccharide and coffee extract to water and mixing.

4. The coffee drink composition according to claim 1, wherein the coffee drink composition is prepared by further mixing one or more kinds of saccharides selected from the group consisting of sucrose, fructose, starch syrup, glucose, rare sugar, high-intensity sweetener, maltitol, D-sorbitol, polyglycitol syrup, indigestible maltodextrin and polydextrose.

5. A method for preparing a coffee drink composition according to claim 4 comprising a step of adding allulose, isomalto-oligosaccharide and coffee extract to water and mixing.

6. The coffee drink composition according to claim 1, wherein the drink composition further comprises one or more of liquid media selected from the group consisting of water, milk and soybean milk.

7. A method for preparing a coffee drink composition according to claim 6 comprising a step of adding allulose, isomalto-oligosaccharide and coffee extract to water and mixing.

8. The coffee drink composition according to claim 1, wherein the coffee drink composition is characterized by comprising 0.1 to 7 g/240 mL of saccharides.

9. A method for preparing a coffee drink composition according to claim 8 comprising a step of adding allulose, isomalto-oligosaccharide and coffee extract to water and mixing.

10. The coffee drink composition according to claim 1, wherein the coffee drink composition is characterized by having a sugar content (Brix) of 0.5 to 20.

11. A method for preparing a coffee drink composition according to claim 10 comprising a step of adding allulose, isomalto-oligosaccharide and coffee extract to water and mixing.

12. A method for preparing a coffee drink composition according to claim 1, comprising a step of adding allulose, isomalto-oligosaccharide and coffee extract to water and mixing.

* * * * *